Dec. 4, 1962 F. H. COKER ET AL 3,066,539
SAMPLING DEVICE
Filed July 11, 1960 2 Sheets-Sheet 2

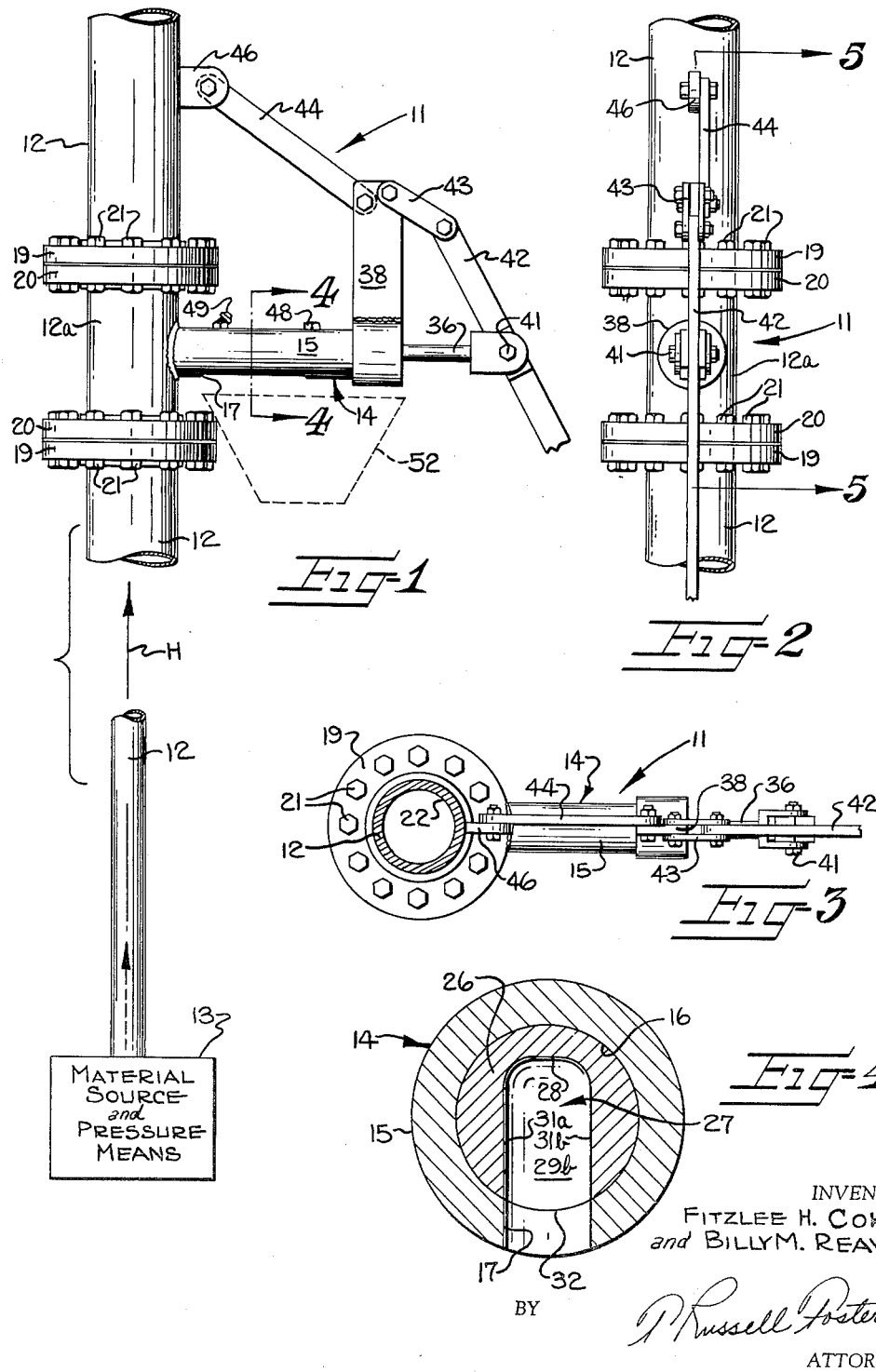

INVENTOR:
FITZLEE H. COKER
and BILLY M. REAVES
BY
P. Russell Foster
ATTORNEY

United States Patent Office 3,066,539
Patented Dec. 4, 1962

3,066,539
SAMPLING DEVICE
Fitzlee H. Coker and Billy M. Reaves, Hartsville, S.C., assignors to Sonoco Products Company, Hartsville, S.C., a corporation of South Carolina
Filed July 11, 1960, Ser. No. 41,874
4 Claims. (Cl. 73—423)

This invention relates to a device for sampling material flowing in a flow line and more particularly to a device for obtaining a sample of lumpy material such as partially digested wood chips flowing in a pipe under pressure and at a high velocity.

For many purposes, it is highly desirable to obtain samples of material flowing in a conduit or pipe, as, for example, from one stage of a process to another, which sample is fully representative of the composition of the material flowing through the conduit. For instance, in wood pulping process, the converting of wood and the like into pulp involves a continuously flowing stream of material from one phase of the process to another and it is highly desirable that representative samples of this material be obtained at various points in the stream. By way of example, it is necessary to obtain samples of the material discharged from a continuous digester to ascertain the chemical and physical state of the wood pulp material. As this material is lumpy and flows under pressure at a high velocity, conventional sampling devices would not be satisfactory in that not only is it difficult to produce a flow of this high velocity pressurized material through a sampling device but the lumpy condition of the material would soon cause clogging and jamming of the sampling device thereby rendering it inoperative. Even when sampling other materials less lumpy than partially digested wood chips, present day sampling devices have inherent disadvantages as they require frequent cleaning to avoid clogging which at best can be accomplished only by dismantling such sampling devices. Furthermore, such present day sampling devices are generally bulky, expensive, and complicated in construction.

Accordingly, a primary object of this invention is to provide a novel sampling device for obtaining a sample of material flowing in a flow line.

Another object of this invention is to provide a novel sampling device for obtaining a sample of material flowing under pressure and at a high velocity in the blow line of a continuous pulp digester.

A further object of this invention is to provide a novel sampling device for obtaining a sample of material flowing in a flow line which is non-clogging even when sampling extremely thick and lumpy material and which may be readily cleaned without dismantling in a simple and easy manner.

Still another object of this invention is to provide a novel sampling device for sampling material flowing in the blow line of a continuous pulp digester which may be readily installed in the blow line, is extremely simple and inexpensive in construction, which may be readily manipulated by an operator to obtain a sample of any desired quantity and which, when not in use, offers no resistance to the material flowing in the blow line.

Other objects and advantages of the invention will become apparent from the following description taken in connection with the accompanying drawing.

In general, the objects of the invention and other related objects are accomplished by providing a sampling device which includes a tubular guide member which is positioned on a flow line with one end exposed to the interior of the flow line. The guide member includes a side wall having an outlet opening formed therein. An elongated sampling member is positioned within the guide member slidably movable therein and is connected at its other end to suitable means for reciprocally moving the sampling member between a retracted position and a material sampling position wherein one end of the sampling member projects into the flow line. The sampling member is provided with a passageway which communicates with both the flow line and the guide member outlet opening when the sampling member is in the sampling position to conduct the material therebetween and permit the material to be discharged from the guide member outlet opening. In the retracted position, this passageway is completely exposed for access through the outlet opening for cleaning and the like.

The novel features which are believed to be characteristic of the invention are set forth with particularity in the appended claims. The invention itself, however, both as to its organization and method of operation may be best understood by reference to the following description taken in conjunction with the accompanying drawings in which:

FIGURE 1 is a side elevation view of the sampling device of the invention on the blow line of a continuous pulp digester;

FIGURE 2 is an end view of the sampling device of FIGURE 1;

FIGURE 3 is a top view of the sampling device of FIGURE 1;

FIGURE 4 is an enlarged sectional view taken substantially along line 4—4 of FIGURE 1 in the direction of the arrows;

Figure 5:
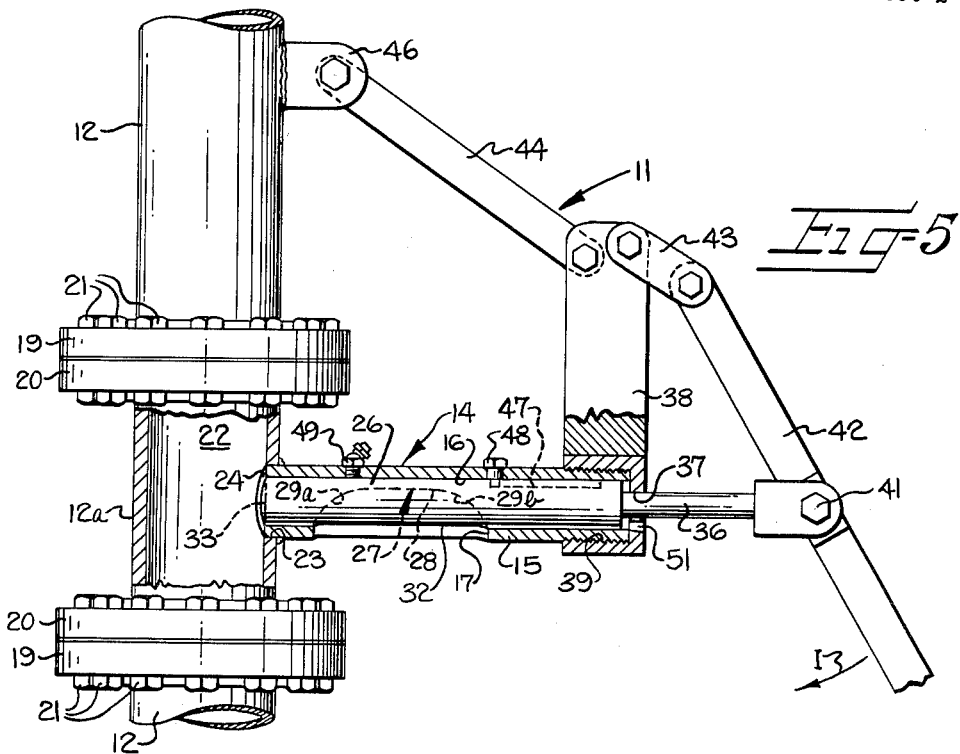
FIGURE 5 is an enlarged view, partially in section taken substantially along line 5—5 of FIGURE 2 in the direction of the arrows showing the sampling device in the inoperative or non-sampling position.

Referring now to the drawings and to FIGURE 1 in particular, there is shown a sampling device constructed in accordance with the invention which is designated generally by the numeral 11. The sampling device in FIGURE 1 is shown installed as will be explained hereinafter on a flow line 12 within which material is conducted. The sampling device 11 may be employed to sample any suitable material flowing in flow line 12 and in the specific embodiment illustrated, the flow line 12 comprises the blow line of a conventional continuous digester and associated apparatus which is illustrated diagrammatically in FIGURE 1 and designated as material source and pressure means 13. As is well known in the pulping art, material is conveyed from the continuous digester through the blow line 12 for subsequent treatment in accordance with conventional pulping processes. The material in the blow line 12 which is generally flowing at a high velocity under a relatively high pressure (generally 170 lbs./sq. inch) is in a form which can best be described as a lumpy, fibrous, partially defibered wood chip mixture and consequently it is extremely difficult, if not impossible, to sample by conventional sampling devices.

Figure 6:
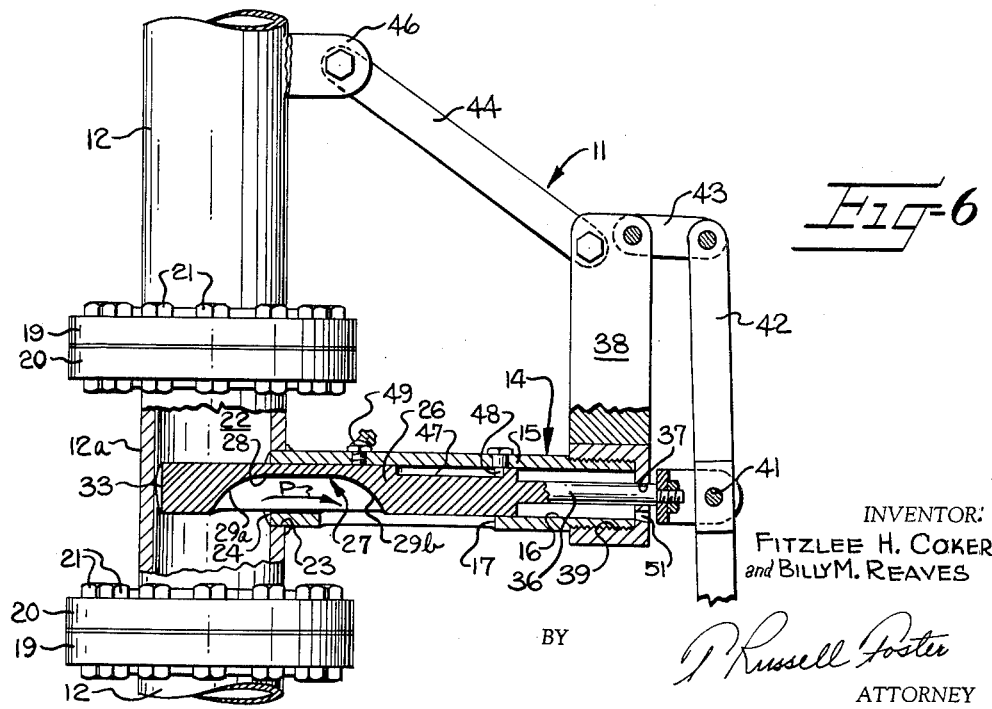
FIGURE 6 is a view similar to FIGURE 5 showing the sampling device in the sampling position.

Referring now to FIGURES 5 and 6, as specifically illustrative of the invention, the sampling device 11 includes a tubular guide member or sleeve designated generally by the number 14 having a side wall 15 defining a central bore 16. The side wall 15 is provided with a longitudinally extending slot 17 as shown best in FIGURES 4–6, which forms an outlet opening for the sample of material obtained from the flow line 12 by the sampling device 11.

In order to provide a suitable mounting arrangement for the sampling device 11, a short line section 12a is provided in flow line 12 and is secured thereto at each end by means such as cooperating pairs of clamping plates 19, 20 on flow line 12 and line section 12a, respectively and clamping bolts 21; thus the line section 12a and flow line 12 define a central bore 22.

One end of the guide member 14 is secured within a lateral opening 23 in the flow line section 12a by means such as welding or the like. This guide member end is formed arcuately as at 24 so as to lie flush with the inner wall of the flow line central bore 22 and therefore offer no resistance to the material flowing in the flow line 12 when the sampling device 11 is in the retracted position.

In order to obtain a sample of the material flowing in flow line 12, a sampling member such as an elongated rod 26 is positioned within the central bore 16 of guide member 14 in sliding relationship therewith so as to be reciprocally movable between a retracted position as shown in FIGURE 5 and a sampling position as shown in FIGURE 6.

Conduit means are provided in the rod 26 for conducting material from the interior of the flow line 12 through the outlet opening or slot 17 in the guide member side wall 15, in the sampling position of FIGURE 6. More specifically, a passageway or groove designated generally by the number 27 is formed within the rod 26 as shown best in FIGURES 4–6 which in the sampling position of FIGURE 6 communicates with both the interior 22 of the flow line 12 and the slot 17 in the guide member side wall 15.

As can be seen, the groove 27 extends longitudinally along the rod 26 and has a depth which extends throughout the major portion of the diameter of the rod 26. The groove 27 is provided with a bottom wall 28 and opposed end walls 29a, and 29b extending therefrom, which diverge arcuately outward and, therefore, move the material entering the groove 27 in an arcuate path therethrough and through the slot 17 in a direction opposite to the direction of material flow in the flow line 12 as indicated by the arrow P in FIGURE 6.

As shown in FIGURE 4, the groove 27 is provided with side walls 31a, and 31b, the outer ends of which together with the outer ends of the groove end walls 29a and 29b define an opening 32 which is substantially identical to the slot 17 in the guide sleeve side wall 15. It can be seen in FIGURES 4, 5 that when the rod 26 is in the retracted position, the groove opening 32 moves into alignment with the slot 17 so that the entire groove 27 is accessible through the slot 17 for cleaning and the like.

The end of the rod 26 adjacent the flow line 12 is arcuately shaped as at 33 to lie flush with the inner wall of the flow line bore 22 when the rod 26 is in the retracted position and, therefore, offers no resistance to the flow of material in the flow line in the manner described above with reference to the arcuate end 24 of the guide member 14.

Means are provided for reciprocally moving the rod 26 between the retracted and the sampling positions. More specifically, the sampling device 11 is arranged for manual operation by means of a portion of reduced diameter 36 on the outer end of the rod 26 remote from the flow line 12 as shown best in FIGURE 6. The rod 36 extends through an opening 37 in a bracket 38 threadably connected at 39 to the outer end of the guide member 14. The rod 36 is connected at its other end by means of a pivotal connection 41 to a manual operating lever 42 connected in turn by means of a linkage 43 to the bracket 38. A bracing member 44 is also provided which is suitably connected between the bracket 38 and a bracket 46 secured as shown to the flow line 12 by means such as welding or the like.

In order to terminate the movement of the rod 26 at the sampling and the retracted positions and to prevent any axial rotation of the rod, the rod is provided with an elongated recess 47 which is arranged to receive a pin 48 mounted in the side wall 15 of the guide member 14 as shown in FIGURES 5 and 6. As can be seen, the pin 48 engages the ends of the slot 47 when the rod 26 has reached the sampling and retracted positions. In addition, a grease fitting 49 may also be provided which is positioned in the side wall 15 and serves to lubricate the rod 26. A drainage outlet 51 may be formed in the bracket 38 to permit trapped liquids in the guide member bore 16 to escape.

In the operation of the sampling device 11 of the invention, the parts normally occupy the position of FIGURE 5 wherein the sampling rod 26 is in the retracted position. The material therefore moves within the flow line 12 without interference from the sampling device 11 as explained above which material may comprise, as discussed above, partially defibered wood chips in a lumpy, fibrous state and discharged under relatively high pressure and velocity from a continuous digester.

When it is desired to obtain a sample of this material, a suitable container 52 is positioned as shown in FIGURE 1 below the guide member slot 17 and the manual operating lever 43 moved in the direction of arrow I of FIGURE 5 to move the sampling rod 26 into the sampling position of FIGURE 6. In this position of rod 26, material enters the groove 27 presented thereto and flows in the direction of the arrow P, through the groove 27 and the slot 17 communicating therewith into the container 52. The flow of material in the groove 27 is aided by the pressure and velocity of the material in the flow line 12 and the arcuate side walls 29a, 29b of the groove offer a minimum of resistance to the flow of this material in the groove.

When a sufficient quantity of material has been obtained, the operating lever 42 is then moved in the opposite direction to the position of FIGURE 5 to withdraw the rod 26 from the line 12 and return it to the retracted position. As discussed above, any material which remains in the groove 27 after sampling may be readily removed and the groove cleaned easily as a result of the access provided by the slot 17. It will be noted that the depth of the groove 27 in rod 26 is selected so as to permit the material to change direction as a result of the arcuate path in which it travels with a minimum of resistance adding considerably to the ease of operation of the sampling device of the invention. Furthermore, the relatively sharp edges of the groove opening 32 adjacent the groove end, wall 29a aids in severing any fibrous material extending partially into groove 29 when the rod 26 is moved to the retracted position of FIGURE 5 and thus eliminates any sticking of rod 26 which might otherwise result.

With the novel construction of this invention, there has been provided a novel sampling device for obtaining a sample of material flowing in the blow line of a continuous pulp digester. This lumpy, fibrous material consisting of partially defibered wood chips has heretofore been extremely difficult to sample directly but with the novel construction of this invention, samples of such material are readily obtained in any desired quantity without clogging. Furthermore, one outstanding feature of the invention is the ease with which the sampling device may be cleaned as a result of the positioning of the groove which conveys material from the flow line to the material discharge outlet opening in a position readily accessible through the outlet opening. In addition, when the sampling device is in the retracted position and is inoperative, parts of the device seat flush with the inner wall of the flow line and offer no resistance to the material flowing in the flow line. It should be understood that any suitable means can be provided for moving the sampling rod 26 including automatic means such as an electrically operated solenoid or the like.

While there has been described what at present is considered to be the preferred embodiment of the invention, it will be understood by those skilled in the art that various changes and modifications may be made thereon without departing from the invention, and therefore, it is the aim of the appended claims to cover all such changes and modifications as fall within the true spirit and scope of the invention.

Having thus described the invention, what is claimed is:

1. A sampling device for withdrawing material from a flow line comprising, in combination, a tubular guide member, means for positioning said guide member on said flow line with one end exposed to the interior of said flow line, said guide member including a side wall having an outlet opening, an elongated rod having a longitudinally extending relatively narrow arcuate groove formed therein reciprocally movable within said guide member, said groove having opposed end walls diverging arcuately outward, means for reciprocally moving said rod in said guide member between a retracted position and a sampling position wherein one end of said rod projects into said flow line, said groove communicating with both the interior of said flow line and said outlet opening when said rod is in said sampling position to conduct said material therebetween, whereby said material is discharged from said outlet opening for sampling in a direction opposite to the direction of the material flowing in said flow line, and said groove having a length not exceeding the length of said side wall outlet opening whereby said groove is completely exposed for access through outlet opening for cleaning when said rod is in said retracted position.

2. A sampling device for withdrawing material from a flow line comprising, in combination, a tubular guide member, means for positioning said guide member on said flow line with one end exposed to the interior of said flow line, said guide member including a side wall having an outlet opening, an elongated rod having a longitudinally extending relatively narrow arcuate groove formed therein reciprocally movable within said guide member, means for reciprocally moving said rod in said guide member between a retracted position and a sampling position wherein one end of said rod projects into said flow line, said rod groove having opposed end walls diverging arcuately outward and defining an opening in the peripheral surface of said rod substantially identical to the outlet opening in said guide member side wall, said groove communicating with both the interior of said flow line and said outlet opening when said rod is in said sampling position to conduct material therebetween whereby said material is discharged from said outlet opening for sampling, and said groove opening being positioned in aligned relationship with the outlet opening in said guide member side wall when said rod is in said retracted position whereby said groove is completely exposed for access through said outlet opening for cleaning.

3. A sampling device in accordance with claim 2 wherein the end of said guide member exposed to the interior of said flow line is formed so as to lie flush with the inner wall of said flow line and said forward end of said rod is similarly formed to lie flush with inner wall of said flow line when said rod is in the retracted position.

4. A sampling device for withdrawing a sample of lumpy material such as partially defibered wood chips flowing under pressure in a flow line comprising, in combination, a guide sleeve having a side wall defining a central bore, an elongated slot in said guide sleeve side wall, a lateral opening in said flow line, means for securing one end of said guide sleeve on said flow line opening, with said one end exposed to the interior of said flow line, said one end being formed so as to lie flush with the inner wall of said flow line, an elongated rod positioned in said sleeve central bore in close fitting, sliding relationship therewith, said rod having a longitudinally extending, relatively narrow, arcuate groove with opposed end walls diverging arcuately outward, and defining an opening in the peripheral surface of said rod substantially identical to said sleeve slot, manually operable means connected to one end of said rod for reciprocally moving said rod in said sleeve bore between a retracted position and a sampling position wherein the other end of said rod projects into said flow line, said rod other end being formed so as to lie flush with the inner wall of said flow line in said retracted position, means for terminating the movement of said rod at said retracted and sampling position, said groove being arranged to communicate with both the interior of said flow line and said sleeve slot when said rod is in said sampling position to conduct said material therebetween and discharge said material through said sleeve slot for sampling, said groove opening being positioned in alignment with said sleeve slot when said rod is in said retracted position to completely expose said groove for access through said slot for cleaning.

References Cited in the file of this patent

UNITED STATES PATENTS

| | | |
|---|---|---|
| 1,966,712 | Fisher et al. | July 17, 1934 |
| 2,370,260 | Robinson | Feb. 27, 1945 |